Nov. 12, 1940.　　　　G. S. EMERY　　　　2,221,233
FAUCET
Filed Jan. 26, 1940

Inventor
George S. Emery
By Eugene K. [signature]
his Attorney

Patented Nov. 12, 1940

2,221,233

UNITED STATES PATENT OFFICE 2,221,233

FAUCET

George S. Emery, Tulsa, Okla.

Application January 26, 1940, Serial No. 315,787

2 Claims. (Cl. 251—27)

This invention relates to faucets of the rotary screw type and aims to provide a faucet which will not leak.

More particularly the invention has for its object to provide a faucet which dispenses with the use of washers or spring elements between its moving parts such as require frequent replacement due to wear or breakage in order to maintain a liquid-tight seal between the valve and valve seat when the faucet is turned off.

The above objects are attained in accordance with the teaching of my invention by the provision of a valve chamber surrounding the valve and valve seat and so constructing and arranging the parts thereof so as to provide an effective barrier to the passage of liquid from the liquid supply pipe to the discharge spout communicating with the valve chamber.

Other objects and advantages will be apparent from the following detailed description of a preferred embodiment of my invention, reference being had to the annexed drawing in which.

Figure 1:
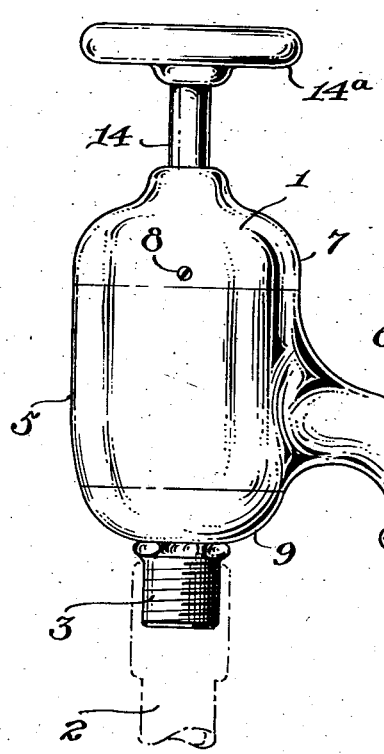
Figure 1 is a perspective view of a water faucet embodying the novel features of the invention.
Figure 2:
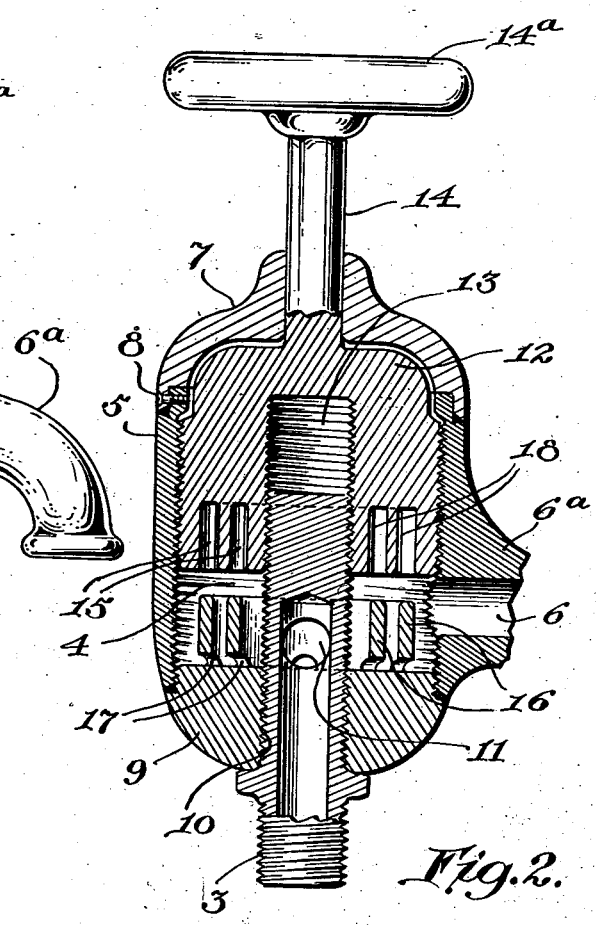
Figure 2 is a longitudinal cross-sectional view of the faucet of Fig. 1.
Figure 3:
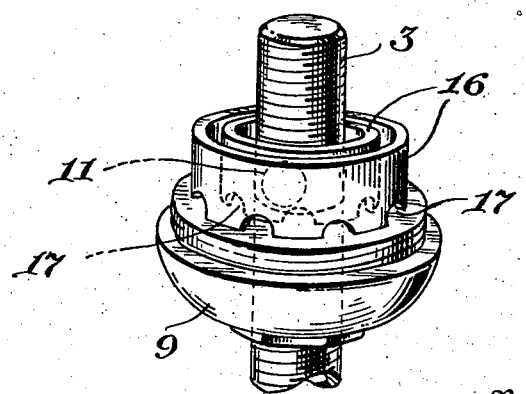
Figure 3 is a detail view of the valve seat forming a part of the faucet.

In Fig. 1 of the drawing is illustrated a faucet 1 adapted to be associated with a water supply pipe 2, shown in broken lines, through which water is adapted to be supplied to the faucet under city pressure. The construction of this faucet is more clearly indicated in the cross-sectional view of Fig. 2. This faucet comprises a pipe section 3 adapted to be screwed upon the end of the water supply pipe 2 and is hollow for a substantial portion of its length extending from the end which connects with the water supply pipe and being closed at its opposite end.

The pipe section 3 is exteriorly threaded and is surrounded by a valve chamber 4 comprising a cylindrical shell 5 through a wall of which is a vent 6 forming part of a discharge spout 6a. The upper end of the shell 5 is closed by a cap which may be press fitted thereon and secured by screws 8. The interior of the shell 5 is screw threaded throughout its length and its lower end screws onto and is closed by a valve seat 9. The valve seat is provided with a centrally disposed screw-threaded opening 10 within which is threadedly received the pipe section 3.

The pipe section 3 is provided with an outlet port 11 through its circumferential wall so as to afford communication between the pipe section and the valve chamber. For opening and closing the port 11 and vent 6 is a cylindrical valve plug 12. This valve is circumferentially screw threaded so as to engage the screw threads upon the interior of the shell 5. The valve plug is likewise centrally bored for a portion of its length from its bottom upwardly toward its top so as to provide a screw threaded opening 13, closed at its top, which engages the screw threads of the pipe section. A stem 14 extending up from the top of the valve plug through an opening in the cap 7 affords means for manually rotating the valve, by a handwheel 14a, for raising and lowering it to uncover and cover the port 11 and vent 6.

The bottom of the valve plug is provided with annular recesses 15 (here shown as two in number but which may be more or less as desired) concentric with the pipe section 3. A corresponding number of annular flanges 16 project upwardly from the face of the valve seat and these flanges are so located and arranged as to telescope within and snugly fill the recesses 15 when the valve is lowered. In order to prevent water from becoming trapped between the flanges 16 and within the recesses 15, a number of escape vents 17 are provided at the roots of the flanges and escape channels 18 are vertically formed along the walls of the recesses.

The operation of the faucet just described is as follows: When the handwheel 14a is rotated in one direction the valve plug is similarly rotated and, by virtue of its screw threaded connections with the pipe section 3 and the shell 5, is caused to move upwardly first uncovering the port 11, then withdrawing the recesses 15 from out of telescopic association with the flanges 16 while also uncovering the discharge vent 6 and finally completing the opening of the discharge vent 6. Water under pressure of the water supply pipe 2 is now free to flow out the port 11 in pipe section 3, through valve chamber 4 and thence out the vent 6 of the spout 6a.

To shut off the faucet, the handwheel 14a is turned in the opposite direction which causes the valve to be screwed downwardly closing the vent 6 and port 11 and causing the recesses 15 to lower over the upright flanges 16. The water within the chamber is forced back into the supply pipe through the port 11 and any liquid trapped between the flanges 16 and in the tops of the recesses 15 above these flanges escapes by way of the vents 17 and the channels 18 back into the chamber.

When the faucet is completely shut off with the valve engaging its seat, the water in the line 2 is precluded from entering the valve chamber by reason of the closure of the port 11 by the valve and any liquid that might seep from this port is barred from passage to the vent 6 by the interfit of the flanges 16 in the recesses 15 and by the screw-threaded surface of engagement between the valve and the shell. The escape vents 17 and escape channels 18 are sufficiently small so as to preclude the possibility of any significant amount of liquid by-passing the flanges 16.

The vent 6 may be located, if desired, adjacent the upper face of the valve seat 9 so that upon closing the valve water is forced out of the valve chamber through the spout 6a; and under such conditions the port 11 may be positioned adjacent the top of the pipe section 3.

As has previously been stated the flanges 16 with their complementary grooves 15 may be of any suitable number, and if desired may be screw-threaded to effect a better seal between their engaging surfaces. Various other changes in arrangement and design may be made without departing from the spirit of the invention.

I claim:

1. A faucet comprising a valve, a valve chamber having a cylindrical bore, a cap secured to and closing the top of the chamber and a valve seat secured to and closing the bottom of the chamber, said chamber being internally screw-threaded throughout its length and said valve being exteriorly screw-threaded to engage the threads upon the chamber, a discharge vent of a spout opening through a circumferential wall of said chamber, a valve-operating stem extending up from the valve through the cap for rotating and moving the valve longitudinally within the chamber to cover and uncover the discharge vent, an externally screw-thread pipe extending through the valve seat and having its upper end threadedly received within an axially extending opening in the valve, a port opening through a circumferential wall of said pipe and providing communication between the interior of the pipe and the chamber, and sealing means between the valve and valve seat, said sealing means comprising a plurality of concentric annular flanges and recesses upon the valve and valve seat providing a snug telescopic fit when the valve is closed against the valve seat and means affording escape for fluid trapped between the sealing means.

2. A faucet comprising a valve, a valve chamber having a cylindrical bore, a cap secured to and closing the top of the chamber and a valve seat secured to and closing the bottom of the chamber, said chamber being internally screw-threaded throughout its length and said valve being exteriorly screw-threaded to engage the threads upon the chamber, a discharge vent of a spout opening through a circumferential wall of said chamber, a valve-operating stem extending up from the valve through the cap for rotating and moving the valve longitudinally within the chamber to cover and uncover the discharge vent, an externally screw-thread pipe extending through the valve seat and having its upper end threadedly received within an axially extending opening in the valve, said discharge vent and port being located at different positions longitudinally of the chamber and one being disposed on a level with the valve seat, a port opening through a circumferential wall of said pipe and providing communication between the interior of the pipe and the chamber, and sealing means between the valve and valve seat, said sealing means comprising a plurality of concentric annular flanges and recesses upon the valve and valve seat providing a snug telescopic fit when the valve is closed against the valve seat, and means affording escape for fluid trapped within the bottoms of the recesses.

GEORGE S. EMERY.